(12) United States Patent
Park et al.

(10) Patent No.: US 10,763,538 B2
(45) Date of Patent: Sep. 1, 2020

(54) METHODS OF FORMING ELECTROCHEMICAL CELLS

(71) Applicant: Enevate Corporation, Irvine, CA (US)

(72) Inventors: Benjamin Yong Park, Mission Viejo, CA (US); Ian Russell Browne, Orange, CA (US); Heidi Leighette Anderson, Rancho Santa Margarita, CA (US)

(73) Assignee: Enevate Corporation, Irvine, CA (US)

( * ) Notice: Subject to any disclaimer, the term of this patent is extended or adjusted under 35 U.S.C. 154(b) by 172 days.

(21) Appl. No.: 15/994,957

(22) Filed: May 31, 2018

(65) Prior Publication Data

US 2019/0181491 A1 Jun. 13, 2019

Related U.S. Application Data

(60) Provisional application No. 62/596,069, filed on Dec. 7, 2017.

(51) Int. Cl.
| | | |
|---|---|---|
| *H01M 10/0525* | (2010.01) | |
| *H01M 4/133* | (2010.01) | |
| *H01M 4/38* | (2006.01) | |
| *H01M 10/058* | (2010.01) | |
| *H01M 2/14* | (2006.01) | |
| *H01M 10/44* | (2006.01) | |
| *H01M 4/02* | (2006.01) | |

(52) U.S. Cl.
CPC ........ *H01M 10/0525* (2013.01); *H01M 2/14* (2013.01); *H01M 4/133* (2013.01); *H01M 4/386* (2013.01); *H01M 10/058* (2013.01); *H01M 10/446* (2013.01); *H01M 2004/027* (2013.01); *H01M 2004/028* (2013.01)

(58) Field of Classification Search
CPC .... H01M 10/0525; H01M 2/14; H01M 4/133; H01M 4/386; H01M 10/058; H01M 10/446; H01M 2004/027; H01M 2004/028
See application file for complete search history.

(56) References Cited

U.S. PATENT DOCUMENTS

| | | |
|---|---|---|
| 8,603,683 B2 | 12/2013 | Park et al. |
| 9,178,208 B2 | 11/2015 | Park et al. |
| 9,397,338 B2 | 7/2016 | Park et al. |
| 9,553,303 B2 | 1/2017 | Park et al. |
| 9,583,757 B2 | 2/2017 | Park et al. |
| 9,620,809 B2 | 4/2017 | Turon Teixidor et al. |

(Continued)

OTHER PUBLICATIONS

International Search Report and Written Opinion for International Application No. PCT/US2018/064302, dated Mar. 15, 2019 in 13 pages.

(Continued)

*Primary Examiner* — Christopher P Domone
(74) *Attorney, Agent, or Firm* — McAndrews, Held & Malloy, Ltd.

(57) ABSTRACT

Methods of forming electrochemical cells are described. In some embodiments, the method can include providing an electrochemical cell having an electrode with at least about 20% to about 99% by weight of silicon. The method can include providing a formation charge current at greater than about 1 C to the electrochemical cell. Alternatively or additionally, the method can include providing a formation charge current at a substantially constant charge voltage to the electrochemical cell.

21 Claims, 6 Drawing Sheets

(56) References Cited

U.S. PATENT DOCUMENTS

| | | | |
|---|---|---|---|
| 9,647,259 B2 | 5/2017 | Park et al. | |
| 9,806,328 B2 | 10/2017 | Park et al. | |
| 9,941,509 B2 | 4/2018 | Park et al. | |
| 9,997,765 B2 | 6/2018 | Park | |
| 10,103,378 B2 | 10/2018 | Park et al. | |
| 2010/0255376 A1 | 10/2010 | Park et al. | |
| 2011/0020701 A1 | 1/2011 | Park et al. | |
| 2011/0111294 A1* | 5/2011 | Lopez | H01M 4/134 429/217 |
| 2013/0043843 A1* | 2/2013 | Amiruddin | H01M 4/131 320/128 |
| 2013/0169238 A1* | 7/2013 | Rojeski | H01M 4/133 320/137 |
| 2014/0170498 A1 | 6/2014 | Park | |
| 2014/0310951 A1* | 10/2014 | Grant | H01M 10/0525 29/623.2 |
| 2017/0040598 A1 | 2/2017 | Wang et al. | |
| 2017/0133664 A1 | 5/2017 | Park | |
| 2017/0133665 A1 | 5/2017 | Park | |
| 2017/0155126 A1 | 6/2017 | Park | |
| 2017/0170510 A1 | 6/2017 | Turon Teixidor et al. | |
| 2017/0200943 A1* | 7/2017 | Kawakami | H01M 4/134 |
| 2017/0279093 A1 | 9/2017 | Park | |
| 2018/0062154 A1 | 3/2018 | Park et al. | |
| 2018/0198114 A1 | 7/2018 | Bonhomme et al. | |
| 2018/0219211 A1 | 8/2018 | Park et al. | |
| 2018/0226642 A1 | 8/2018 | Wang et al. | |
| 2018/0287129 A1 | 10/2018 | Park | |

OTHER PUBLICATIONS

Ma et al., "Si-Based Anode Materials for Li-Ion Batteries: A Mini Review", Nano-Micro Letters, 2014, vol. 6, No. 4, pp. 347-358.

International Preliminary Report on Patentability, PCT/US2018/064302, dated Jun. 18, 2020, 8 pages.

* cited by examiner

METHODS OF FORMING ELECTROCHEMICAL CELLS

CROSS-REFERENCE TO RELATED APPLICATIONS

This application claims the benefit of U.S. Provisional Application No. 62/596,069, filed Dec. 7, 2017. The entirety of the above referenced application is hereby incorporated by reference.

BACKGROUND

Field of the Invention

The present disclosure relates to electrodes, electrochemical cells, and methods of forming electrodes and electrochemical cells. In particular, the present disclosure relates to methods of formation of electrochemical cells, including lithium-ion batteries.

Description of the Related Art

A lithium-ion battery typically includes a separator and/or electrolyte between an anode and a cathode. In one class of batteries, the separator, cathode and anode materials are individually formed into sheets or films. Sheets of the cathode, separator and anode are subsequently stacked or rolled with the separator separating the cathode and anode (e.g., electrodes) to form the battery. For the cathode, separator and anode to be rolled, each sheet must be sufficiently deformable or flexible to be rolled without failures, such as cracks, brakes, mechanical failures, etc. Typical electrodes include electro-chemically active material layers on electrically conductive metals (e.g., aluminum and copper). For example, carbon can be deposited onto a current collector along with an inactive binder material. Carbon is often used because it has excellent electrochemical properties and is also electrically conductive. Electrodes can be rolled or cut into pieces which are then layered into stacks. The stacks are of alternating electro-chemically active materials with the separator between them.

SUMMARY

In certain embodiments, a method of forming an electrochemical cell is provided. The method can include providing an electrochemical cell having a rated capacity at 1 C, and providing a formation charge current at greater than about 1 C to the cell. The electrochemical cell can include a first electrode and a second electrode. At least the first electrode can include at least about 20% to about 99% by weight of silicon. The electrochemical cell can also include a separator between the first electrode and the second electrode. The electrochemical cell can include an electrolyte in contact with the first electrode, the second electrode, and the separator.

In some embodiments, the formation charge current can be provided at greater than about 2 C. In some embodiments, the formation charge current can be provided at less than or equal to about 20 C. In some examples, the formation charge current can be provided for about 3 minutes to about 60 minutes. In some instances, providing the formation charge current can comprise charging to partial formation. For example, charging to partial formation can comprise charging to about 10% to about 90% of total capacity of the electrochemical cell, to about 20% to about 70% of the total capacity of the electrochemical cell, or to about 30% to about 50% of the total capacity of the electrochemical cell.

In some embodiments, providing the formation charge current can comprise providing a substantially constant formation charge current. In some embodiments, providing the formation charge current can comprise providing the formation charge current at a charge voltage from about 3 volts to about 6 volts. The electrochemical cell can be a lithium-ion battery and providing the formation charge current can comprise providing the formation charge current with substantially no lithium plating.

In some embodiments, the first electrode can be an anode. The first electrode can include a silicon-dominant electrode. For example, the first electrode can comprise the silicon at about 30% to about 99% by weight, at about 40% to about 99% by weight, at about 50% to about 99% by weight, at about 60% to about 99% by weight, at about 70% to about 99% by weight, or at about 80% to about 99% by weight. In some instances, the first electrode can further comprise graphite.

In certain embodiments, a method of forming an electrochemical cell is provided. The method can include providing an electrochemical cell having a rated capacity at 1 C, and providing an initial formation charge current at a substantially constant charge voltage to the electrochemical cell. The electrochemical cell can include a first electrode and a second electrode. At least the first electrode can include at least about 20% to about 99% by weight of silicon. The electrochemical cell can also include a separator between the first electrode and the second electrode. The electrochemical cell can include an electrolyte in contact with the first electrode, the second electrode, and the separator.

In some embodiments, the charge voltage can be from about 3 volts to about 6 volts. The initial formation charge current can be provided for about 3 minutes to about 60 minutes. Providing the initial formation charge current can comprise charging to partial formation. For example, charging to partial formation can comprise charging to about 10% to about 90% of total capacity of the electrochemical cell, to about 20% to about 70% of the total capacity of the electrochemical cell, or to about 30% to about 50% of the total capacity of the electrochemical cell.

In some embodiments, the initial formation charge current can be provided at greater than about 1 C. In some embodiments, the initial formation charge current can be provided at greater than about 2 C. In some embodiments, the formation charge current can be provided at less than or equal to about 20 C. In some embodiments, the electrochemical cell can be a lithium-ion battery and providing the initial formation charge current can comprise providing the formation charge current with substantially no lithium plating In some instances, the first electrode can be an anode. The first electrode can include a silicon-dominant electrode. For example, the first electrode can comprise the silicon at about 30% to about 99% by weight, at about 40% to about 99% by weight, at about 50% to about 99% by weight, at about 60% to about 99% by weight, at about 70% to about 99% by weight, or at about 80% to about 99% by weight. In some instances, the first electrode can further comprise graphite.

DETAILED DESCRIPTION

Figure 1:
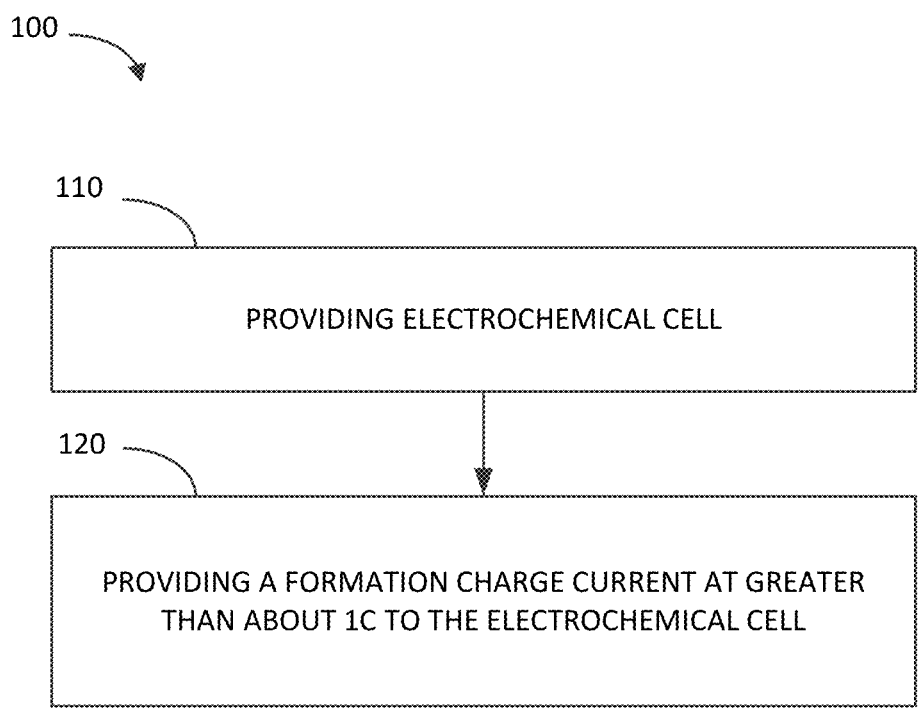
FIG. 1 is a flow diagram schematically illustrating an example method of forming an electrochemical cell in accordance with certain embodiments described herein.

Formation is a step in the production process of electrochemical cells, such as lithium-ion batteries. This step typically occurs in a factory before delivery of cells to a customer. The step usually involves applying current to the cell in such a way that causes lithium to be inserted into the negative electrode. This first "charge" can cause the system to undergo reversible and irreversible reactions. For stability, it may be desirable to control the reactions to control the interfacial layer known as the solid-electrolyte interface (SEI) formed between electrodes and electrolyte and to expel any gasses formed (e.g., such as in a process called degassing). In some cases, the temperature can be increased to increase reaction rate. During formation, typically, the potential of the negative electrode decreases. As the potential of the negative electrode decreases, it can fall below the stability window of the electrolyte solution. The electrolyte solution can begin to react with the negative electrode, forming the SEI. In general, the SEI can reduce and/or minimize further reactions between the negative electrode and the electrolyte solution without preventing the transport of lithium ions to and from the negative electrode. In order to control the nature of the SEI (and thus control the performance characteristics of the cell), it may be desirable to control the formation process. Typically, formation is done with low current in an environment with precise temperature control, and this combination of long process time (due to low current) and costly equipment (due to precise control) can make formation a significant portion of the cost of manufacturing lithium-ion batteries. High currents are generally avoided as they can cause lithium plating and/or other detrimental effects. This is the case especially with graphite which may be the most commonly used anode active material today. Accordingly, formation can be one of the most expensive parts of manufacturing (e.g., due to the time spent in the formation process and the equipment for formation). Many companies are looking to reduce time in formation so that capital investment costs can be reduced.

This application describes certain methods of forming an electrochemical cell which can be performed with decreased formation processing time and with less sophisticated equipment, e.g., compared with current processes. Some examples can include providing an electrochemical cell that has an electrode (e.g., an anode) comprising silicon (e.g., at least about 20% by weight of silicon). Some such electrodes can be advantageous in that relatively high current during formation can be applied without damage to the cell. For example, these electrodes can have relatively high potentials such that lithium plating and other detrimental effects are less likely. Accordingly, some methods can include providing a formation charge current at greater than about 1 C (or at greater than about 1 C charge rate), which can decrease the formation time. Further, since these electrodes can handle relatively high charge currents, there may be less need for precise current control. Additionally, some methods can include providing a constant charge voltage (where current may vary) with reduced and/or minimal programming requirements and/or current control, which can be performed with less costly equipment.

Formation Current

FIG. 1 is a flow diagram schematically illustrating an example method of forming an electrochemical cell in accordance with certain embodiments described herein. The method 100 of forming an electrochemical cell can include providing an electrochemical cell as shown in block 110. The electrochemical cell can include a first and second electrode, a separator between the first and second electrodes, and electrolyte in contact with the first electrode, the second electrode, and the separator. At least one of the electrodes can comprise at least about 20% by weight of silicon (e.g., at least about 20% to about 99% by weight of silicon).

Various such electrodes as described herein can handle relatively high charge current and/or charge rate without damage to the cell. Accordingly, as shown in block 120, the method 100 of certain embodiments can include providing a formation charge current at greater than about 1 C to the cell.

Without being bound by theory, one reason various embodiments of electrodes (e.g., anodes) described herein can take relatively high currents is because the electrodes have a relatively high potential, for example, compared to graphite vs Li/Li+. Because various silicon electrodes described herein are relatively high in voltage, the electrodes may not be fully utilized, and can have excess capacity.

In contrast, most electrodes that are considered "silicon anodes" in the industry are graphite anodes with silicon added in relatively small quantities (typically <20%). These graphite-silicon mixture anodes have to utilize the graphite which has a lower voltage compared to silicon. Because of this, the silicon has to be mostly fully utilized to utilize the graphite. Accordingly, these graphite electrodes may not have the advantage of various embodiments of silicon or silicon composite electrodes where the voltage of the electrode is substantially above 10 mV vs Li/Li+.

Figure 2:
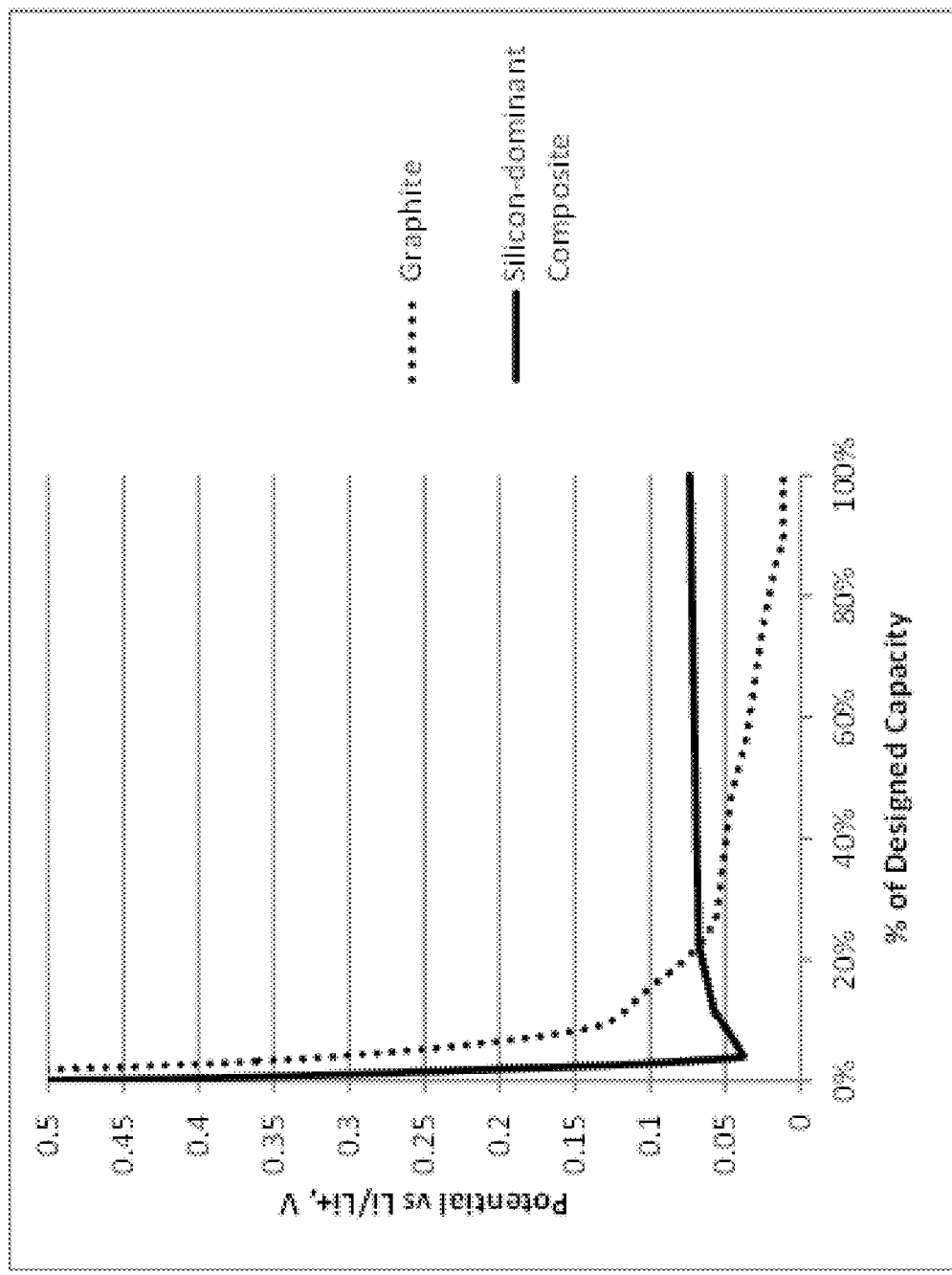
FIG. 2 shows a comparison between the formation voltage profiles of two half-cells made with a standard graphite electrode and an example silicon-dominant composite electrode.

FIG. 2 shows a comparison between the formation voltage profiles of two half-cells made with a standard graphite electrode and an example silicon-dominant composite electrode. In both cases, the electrodes were lithiated to their designed capacities. As shown in FIG. 2, the potential of the graphite electrode fell to ~10 mV vs Li/Li+, whereas the potential of the silicon-dominant composite electrode stabilized at ~70 mV vs Li/Li+ after the initial activation. The graphite electrode was a 3.1 mA/cm$^2$, 96% graphite, 4% PVdF coated anode. It was formed at 0.68 mA/cm$^2$ to 10 mV and tapered to 0.11 mA/cm$^2$. The silicon-dominant composite electrode was a 2.97 mA/cm$^2$, 80% silicon composite anode. It was formed at 0.30 mA/cm$^2$ to nominal capacity. The relatively low potential of the graphite electrode can be problematic because non-uniformities in current density, diffusion, or charge transfer rate can create localized areas of low potential where lithium plating can occur. In contrast, the relatively high potential of the silicon-dominate composite electrode makes lithium plating dramatically less likely. Via Ohm's law, the relative rate advantage of the silicon-dominant composite electrode over the graphite electrode at a given impedance can be expressed as the ratio of the characteristic potentials vs. Li/Li+. Accordingly, the example silicon-dominant composite electrode can have a 7× improvement (e.g., 70 mV/10 mV) in rate capability over the graphite anode.

With reference to block 110 in FIG. 1, the provided electrochemical cell can include at least one electrode comprising a silicon-dominant electrode. The electrode can include at least about 20% by weight of silicon. In certain embodiments, the electrode can include at least about 20% to about 99% by weight of silicon. For example, the weight percentage of silicon can be any value within this range (e.g., about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, etc.), or any range within this range such as any range formed by the example values (e.g., about 30% to about 99%, about 40% to about 99%, about 50% to about 99%, about 60% to about 99%, about 70% to about 99%, about 80% to about 99%, about 90% to about 99%, about 30% to about 95%, about 40% to about 95%, about 50% to about 95%, about 60% to about 95%, about 70% to about 95%, about 80% to about 95%, about 30% to about 90%, about 40% to about 90%, about 50% to about 90%, about 60% to about 90%, about 70% to about 90%, about 80% to about 90%, etc.). The electrode can also include additives such as conductive material (e.g., one or more metals or alloys) and/or graphite active material. U.S. patent application Ser. No. 13/008,800, filed Jan. 18, 2011, and published on Jul. 21, 2011 as U.S. Patent Application Publication No. 2011/0177393, entitled "Composite Materials for Electrochemical Storage;" U.S. patent application Ser. No. 13/601,976, filed Aug. 31, 2012, and published on Jun. 19, 2014 as U.S. Patent Application Publication No. 2014/0170498, entitled "Silicon Particles for Battery Electrodes;" and U.S. patent application Ser. No. 13/799,405, filed Mar. 13, 2013, and published on Jun. 19, 2014 as U.S. Patent Application Publication No. 2014/0166939, entitled "Silicon Particles for Battery Electrodes," each of which are incorporated by reference herein, describe certain embodiments of carbon-silicon composite materials using carbonized polymer and silicon material which can be used as the silicon-dominant electrode. Further example embodiments of the electrode are described herein.

The silicon-dominant electrode can be used as an anode, a cathode, or both an anode and cathode. For example, the composite material can be used as an anode in electrochemical cells, e.g., most conventional lithium-ion batteries; they may also be used as the cathode in some electrochemical couples, e.g., with additional additives. In some instances, the voltage of the electrodes can be designed to be higher than about 20 mV to about 70 mV vs Li/Li+. Various embodiments of the provided electrochemical cells can be either secondary batteries (e.g., rechargeable) or primary batteries (e.g., non-rechargeable). The electrochemical cell can have a rated capacity of 1 C.

With reference to block 120 in FIG. 1, the formation charge current can be provided at greater than about 1 C (e.g., greater than about 1.2 C, greater than about 1.5 C, greater than about 1.7 C, etc.) to the electrochemical cell. In some embodiments, the formation charge current can be provided at between about 1 C to about 20 C. For example, the formation charge current can be provided at any charge rate within this range (e.g., about 1 C, about 1.2 C, about 1.5 C, about 1.7 C, about 2 C, about 2.5 C, about 3 C, about 3.5 C, about 4 C, about 4.5 C, about 5 C, about 7 C, about 10 C, about 12 C, about 15 C, about 17 C, about 20 C, etc.), or any range within this range such as any range formed by the example values (e.g., about 1.2 C to about 20 C, about 1.5 C to about 20 C, about 1.7 C to about 20 C, about 2 C to about 20 C, about 1.5 C to about 15 C, about 2 C to about 15 C, about 1.5 C to about 10 C, about 2 C to about 10 C, etc.). Other examples are possible. In some instances, the formation charge current can be substantially constant. In some such instances, the formation charge current can be substantially constant for a certain period of time followed by a taper charge to a lower rate, for example, as under a constant current, constant voltage procedure. In some cases, the formation charge current may vary.

In various embodiments, the formation charge current can be provided to the electrochemical cell with substantially no lithium plating and/or other undesired side reactions during formation. Because the silicon-dominant electrodes can accept relatively high charge rates, formation can be performed in a fraction of time compared to conventional manufacturing. In some embodiments, the formation charge current can be provided for only about 3 minutes to about 60 minutes (e.g., compared to about 360 minutes for conventional manufacturing). For example, the amount of time the formation charge current is provided can be any amount of time within this range (e.g., about 3 minutes, about 3.5 minutes, about 4 minutes, about 4.5 minutes, about 5 minutes, about 10 minutes, about 15 minutes, about 20 minutes, about 25 minutes, about 30 minutes, about 35 minutes, about 40 minutes, about 45 minutes, about 60 minutes, etc.), or any range within this range such as any range formed by the example values (e.g., about 3 minutes to about 50 minutes, about 3 minutes to about 45 5 minutes, about 3 minutes to about 30 minutes, about 3 minutes to about 20 minutes, about 3 minutes to about 10 minutes, about 5 minutes to about 50 minutes, about 5 minutes to about 45 minutes, about 5 minutes to about 30 minutes, about 5 minutes to about 20 minutes, about 5 minutes to about 10 minutes, etc.). The whole formation process, which may typically include additional steps such as rests, aging at temperature, or discharge, may be completed in about 10 minutes to about 120 minutes (compared to about 15 hours to about 60 hours for conventional manufacturing). Other examples are possible.

In some instances, to further reduce processing time and/or reduce irreversible capacity, the cell can be charged to partial formation. For example, the formation charge current can be provided from about 10% to about 90% of the total capacity of the cell. For example, the formation charge current can be provided to any percentage within this range (e.g., about 10%, about 15%, about 20%, about 25%, about 30%, about 35%, about 40%, about 45%, about 50%, about 55%, about 60%, about 65%, about 70%, about 75%, about 80%, about 85%, about 90%, etc.), or any range within this range such as any range formed by the example values (e.g., about 15% to about 90%, about 20% to about 90%, about 30% to about 90%, about 40% to about 90%, about 50% to about 90%, about 15% to about 80%, about 20% to about 80%, about 30% to about 80%, about 40% to about 80%, about 50% to about 80%, about 15% to about 70%, about 20% to about 70%, about 30% to about 70%, about 40% to about 70%, about 50% to about 70%, about 15% to about 60%, about 20% to about 60%, about 30% to about 60%, about 40% to about 60%, about 50% to about 60%, about 15% to about 50%, about 20% to about 50%, about 30% to about 50%, etc.). Other examples are possible.

Constant Voltage

Figure 3:
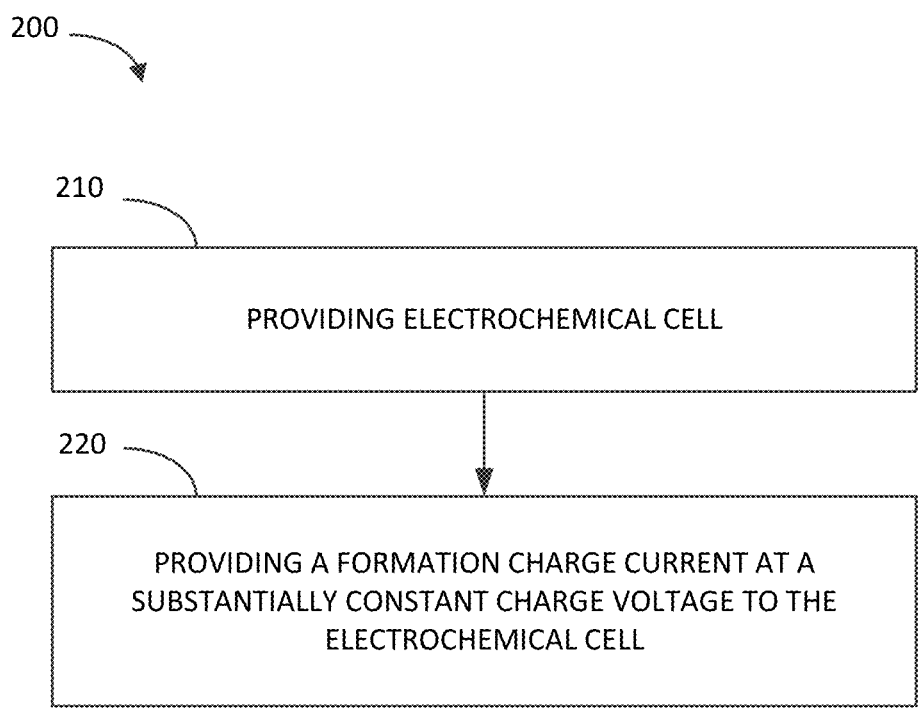
FIG. 3 is a flow diagram schematically illustrating another example method of forming an electrochemical cell in accordance with certain embodiments described herein.

FIG. 3 is a flow diagram schematically illustrating another example method of forming an electrochemical cell in accordance with certain embodiments described herein. The method 200 of forming an electrochemical cell can include providing an electrochemical cell as shown in block 210. The electrochemical cell can include any of the electrochemical cells as described herein with respect to the provided electrochemical cell described in relation to FIG. 1. Because the electrochemical cells have electrodes that can handle relatively high charge current and/or charge rate without damage and/or undesirable effects to the cell, there can be less of a need for precise current control. In some embodiments, formation can be performed using a constant charge voltage (e.g., providing initial charge current at a substantially constant charge voltage). Although current may vary under a constant charge voltage, the need for precise current control and/or other programing requirements can be reduced and/or minimized. As shown in block 220, the method 200 of certain embodiments can include providing a formation charge current at substantially constant charge voltage to the cell. Accordingly, various embodiments of methods can be performed on less sophisticated (and less costly) equipment.

With reference to block 220 in FIG. 3, the substantially constant charge voltage can be from about 3V to about 6V. For example, the substantially constant charge voltage can be any value within this range (e.g., about 3V, about 3.1V, about 3.2V, about 3.3V, about 3.4V, about 3.5V, about 3.6V, about 3.7V, about 3.8V, about 3.9V, about 4.0V, about 4.1V, about 4.2V, about 4.3V, about 4.4V, about 4.5V, about 4.6V, about 4.7V, about 4.8V, about 4.9V, about 5.0V, about 5.1V, about 5.2V, about 5.3V, about 5.4V, about 5.5V, about 5.6V, about 5.7V, about 5.8V, about 5.9V, about 6.0V, etc.), or any range within this range such as any range formed by the example values (e.g., about 3.1V to about 6V, about 3.2V to about 6V, about 3.3V to about 6V, about 3.4V to about 6V, about 3.5V to about 6V, about 3V to about 5.5V, about 3.1V to about 5.5V, about 3.2V to about 5.5V, about 3.3V to about 5.5V, about 3.4V to about 5.5V, about 3.5V to about 5.5V, etc.). Other examples are possible.

In various embodiments, the initial formation charge current at a substantially constant charge voltage can be provided to the electrochemical cell with substantially no lithium plating and/or other undesired side reactions during formation. Because the silicon-dominant electrodes can accept relatively high charge rates, formation charge current can be provided at greater than about 1 C to the cell (e.g., as described herein, greater than about 1.2 C, greater than about 1.5 C, greater than about 1.7 C, greater than about 2 C, etc.). In various such embodiments, as described herein, since the formation charge current can be provided at greater than about 1 C, formation can be performed in a fraction of time compared to conventional manufacturing. In addition, as also described herein, to further reduce processing time and/or reduce irreversible capacity, the cell can be charged to partial formation. For example, as described herein, the formation charge current can be provided from about 10% to about 90% of the total capacity.

Electrodes and Methods of Forming the Same

In various embodiments, the electrodes (e.g., anodes and cathodes) may include carbonized polymer and silicon material. For example, a mixture that includes a carbon precursor including silicon material can be formed into a composite material. This mixture can include both carbon and silicon and thus can be referred to as a carbon-silicon composite material, a silicon-carbon composite material, a carbon composite material, or a silicon composite material.

Typical carbon anode electrodes include a current collector such as a copper sheet. Carbon is deposited onto the collector along with an inactive binder material. Carbon is often used because it has excellent electrochemical properties and is also electrically conductive. Anode electrodes used in the rechargeable lithium-ion cells typically have a specific capacity of approximately 200 milliamp hours per gram (including the metal foil current collector, conductive additives, and binder material). Graphite, the active material used in most lithium-ion battery anodes, has a theoretical energy density of 372 milliamp hours per gram (mAh/g). In comparison, silicon has a high theoretical capacity of 4200 mAh/g. Silicon, however, swells in excess of 300% upon lithiation. Because of this expansion, anodes including silicon may expand/contract and lose electrical contact to the rest of the anode. Therefore, a silicon anode should be designed to be able to expand while maintaining good electrical contact with the rest of the electrode.

U.S. patent application Ser. No. 13/008,800, U.S. patent application Ser. No. 13/601,976, and U.S. patent application Ser. No. 13/799,405, each of which are incorporated by reference herein, describe certain embodiments of carbon-silicon composite materials using carbonized polymer and silicon material. The carbonized polymer can act as an expansion buffer for silicon particles during cycling so that a high cycle life can be achieved. In certain embodiments, the resulting electrode can be an electrode that is comprised substantially of active material. For example, the carbonized polymer can form a substantially continuous conductive carbon phase(s) in the entire electrode as opposed to particulate carbon suspended in a non-conductive binder in one class of conventional lithium-ion battery electrodes. Because the polymer can be converted into an electrically conductive and electrochemically active matrix, the resulting electrode can be conductive enough that a metal foil or mesh current collector may be omitted, minimized, or reduced in some embodiments. Accordingly, in U.S. patent application Ser. No. 13/008,800, application Ser. No. 13/601,976, and U.S. patent application Ser. No. 13/799,405, certain embodiments of monolithic, self-supported electrodes are disclosed. The electrodes can have a high energy density of between about 500 mAh/g to about 3500 mAh/g that can be due to, for example, 1) the use of silicon, 2) elimination or substantial reduction of metal current collectors, and 3) being comprised entirely or substantially entirely of active material.

The carbon-silicon composite material can be formed by forming a mixture including a precursor, and pyrolyzing the precursor to convert the precursor to a carbon phase. In certain embodiments, the carbon precursor is a hydrocarbon compound. For example, the precursor can include polyamideimide, polyamic acid, polyimide, etc. Other precursors include phenolic resins, epoxy resins, and other polymers. The mixture can further include a solvent. For example, the solvent can be N-methyl-pyrollidone (NMP). Other possible solvents include acetone, diethyl ether, gamma butyrolactone, isopropanol, dimethyl carbonate, ethyl carbonate, dimethoxyethane, etc. Examples of precursor and solvent solutions include PI-2611 (HD Microsystems), PI-5878G (HD Microsystems) and VTEC PI-1388 (RBI, Inc.). PI-2611 is comprised of >60% n-methyl-2-pyrollidone and 10-30% s-biphenyldianhydride/p-phenylenediamine. PI-5878G is comprised of >60% n-methylpyrrolidone, 10-30% polyamic acid of pyromellitic dianhydride/oxydianiline, 10-30% aromatic hydrocarbon (petroleum distillate) including 5-10% 1,2,4-trimethylbenzene. In certain embodiments, the amount of precursor (e.g., solid polymer) in the solvent is about 10 wt. % to about 30 wt. %.

The mixture can include silicon particles as described herein. The mixture may comprise about 5% to about 80% by weight of the precursor, and at least about 20% to about 99% by weight of the silicon particles. Additional materials can also be included in the mixture. As an example, carbon particles including graphite active material, chopped or milled carbon fiber, carbon nanofibers, carbon nanotubes, and other conductive carbons can be added to the mixture. Conductive particles can also be added to the mixture. In addition, the mixture can be mixed to homogenize the mixture.

In certain embodiments, the mixture is cast on a substrate. In some embodiments, casting includes using a gap extrusion, tape casting, or a blade casting technique. The blade casting technique can include applying a coating to the substrate by using a flat surface (e.g., blade) which is controlled to be a certain distance above the substrate. A liquid or slurry can be applied to the substrate, and the blade can be passed over the liquid to spread the liquid over the substrate. The thickness of the coating can be controlled by the gap between the blade and the substrate since the liquid passes through the gap. As the liquid passes through the gap, excess liquid can also be scraped off. For example, the mixture can be cast on a substrate comprising a polymer sheet, a polymer roll, and/or foils or rolls made of glass or metal. The mixture can then be dried to remove the solvent. For example, a polyamic acid and NMP solution can be dried at about 110° C. for about 2 hours to remove the NMP solution. The dried mixture can then be removed from the substrate. For example, an aluminum substrate can be etched away with HCl. Alternatively, the dried mixture can be removed from the substrate by peeling or otherwise mechanically removing the dried mixture from the substrate. In some embodiments, the substrate comprises polyethylene terephthalate (PET), including for example Mylar®. In certain embodiments, the dried mixture is a film or sheet. In some embodiments, the dried mixture is optionally cured. In some embodiments, the dried mixture may be further dried. For example, the dried mixture can placed in a hot press (e.g., between graphite plates in an oven). A hot press can be used to further dry and/or cure and to keep the dried mixture flat. For example, the dried mixture from a polyamic acid and NMP solution can be hot pressed at about 200° C. for about 8 to 16 hours. Alternatively, the entire process including casting and drying can be done as a roll-to-roll process using standard film-handling equipment. The dried mixture can be rinsed to remove any solvents or etchants that may remain. For example, de-ionized (DI) water can be used to rinse the dried mixture. In certain embodiments, tape casting techniques can be used for the casting. In some embodiments, the mixture can be coated on a substrate by a slot die coating process (e.g., metering a constant or substantially constant weight and/or volume through a set or substantially set gap). In some other embodiments, there is no substrate for casting and the anode film does not need to be removed from any substrate. The dried mixture may be cut or mechanically sectioned into smaller pieces.

The mixture further goes through pyrolysis to convert the polymer precursor to carbon. In certain embodiments, the mixture is pyrolysed in a reducing atmosphere. For example, an inert atmosphere, a vacuum and/or flowing argon, nitrogen, or helium gas can be used. In some embodiments, the mixture is heated to about 900° C. to about 1350° C. For example, polyimide formed from polyamic acid can be carbonized at about 1175° C. for about one hour. In certain embodiments, the heat up rate and/or cool down rate of the mixture is about 10° C./min. A holder may be used to keep the mixture in a particular geometry. The holder can be graphite, metal, etc. In certain embodiments, the mixture is held flat. After the mixture is pyrolysed, tabs can be attached to the pyrolysed material to form electrical contacts. For example, nickel, copper or alloys thereof can be used for the tabs.

In certain embodiments, one or more of the methods described herein can be carried out in a continuous process. In certain embodiments, casting, drying, possibly curing and pyrolysis can be performed in a continuous process. For example, the mixture can be coated onto a glass or metal cylinder. The mixture can be dried while rotating on the cylinder to create a film. The film can be transferred as a roll or peeled and fed into another machine for further processing. Extrusion and other film manufacturing techniques known in industry could also be utilized prior to the pyrolysis step.

Pyrolysis of the precursor results in a carbon material (e.g., at least one carbon phase). In certain embodiments, the carbon material is a hard carbon. In some embodiments, the precursor is any material that can be pyrolysed to form a hard carbon. When the mixture includes one or more additional materials or phases in addition to the carbonized precursor, a composite material can be created. In particular, the mixture can include silicon particles, creating a silicon-carbon (e.g., at least one first phase comprising silicon and at least one second phase comprising carbon) or silicon-carbon-carbon (e.g., at least one first phase comprising silicon, at least one second phase comprising carbon, and at least one third phase comprising carbon) composite material.

Silicon particles can increase the specific lithium insertion capacity of the composite material. When silicon absorbs lithium ions, it experiences a large volume increase on the order of 300+ volume percent which can cause electrode structural integrity issues. In addition to volumetric expansion related problems, silicon is not inherently electrically conductive, but becomes conductive when it is alloyed with lithium (e.g., lithiation). When silicon de-lithiates, the surface of the silicon losses electrical conductivity. Furthermore, when silicon de-lithiates, the volume decreases which results in the possibility of the silicon particle losing contact with the matrix. The dramatic change in volume also results in mechanical failure of the silicon particle structure, in turn, causing it to pulverize. Pulverization and loss of electrical contact have made it a challenge to use silicon as an active material in lithium-ion batteries. A reduction in the initial size of the silicon particles can prevent further pulverization of the silicon powder as well as minimizing the loss of surface electrical conductivity. Furthermore, adding material to the composite that can elastically deform with the change in volume of the silicon particles can reduce the chance that electrical contact to the surface of the silicon is lost. For example, the composite material can include carbons such as graphite which contributes to the ability of the composite to absorb expansion and which is also capable of intercalating lithium ions adding to the storage capacity of the electrode (e.g., chemically active). Therefore, the composite material may include one or more types of carbon phases.

As described herein, in order to increase volumetric and gravimetric energy density of lithium-ion batteries, silicon may be used as the active material for the cathode or anode. Several types of silicon materials, e.g., silicon nanopowders, silicon nanofibers, porous silicon, and ball-milled silicon, are viable candidates as active materials for the negative or positive electrode. As described herein, the amount of silicon provided in the mixture or in the composite material can be within a range from about 20% to about 99% by weight of the composite material.

In some embodiments, all, substantially all, or at least some of the silicon particles may have a particle size (e.g., the diameter or the largest dimension of the particle) less than about 50 μm, less than about 40 μm, less than about 30 μm, less than about 20 μm, less than about 10 μm, less than about 1 μm, between about 10 nm and about 50 μm, between about 10 nm and about 40 μm, between about 10 nm and about 30 μm, between about 10 nm and about 20 μm, between about 0.1 μm and about 20 μm, between about 0.5 μm and about 20 μm, between about 1 μm and about 20 μm, between about 1 μm and about 15 μm, between about 1 μm and about 10 μm, between about 10 nm and about 10 μm, between about 10 nm and about 1 μm, less than about 500 nm, less than about 100 nm, and about 100 nm. For example, in some embodiments, the average particle size (or the average diameter or the average largest dimension) or the median particle size (or the median diameter or the median largest dimension) of the silicon particles can be less than about 50 μm, less than about 40 μm, less than about 30 μm, less than about 20 μm, less than about 10 μm, less than about 1 μm, between about 10 nm and about 50 μm, between about 10 nm and about 40 μm, between about 10 nm and about 30 μm, between about 10 nm and about 20 μm, between about 0.1 μm and about 20 μm, between about 0.5 μm and about 20 μm, between about 1 μm and about 20 μm, between about 1 μm and about 15 μm, between about 1 μm and about 10 μm, between about 10 nm and about 10 μm, between about 10 nm and about 1 μm, less than about 500 nm, less than about 100 nm, and about 100 nm. In some embodiments, the silicon particles may have a distribution of particle sizes. For example, at least about 95%, at least about 90%, at least about 85%, at least about 80%, at least about 70%, or at least about 60% of the particles may have the particle size described herein.

In certain embodiments, the silicon particles are at least partially crystalline, substantially crystalline, and/or fully crystalline. Furthermore, the silicon particles may or may not be substantially pure silicon. For example, the silicon particles may be substantially silicon or may be a silicon alloy. In one embodiment, the silicon alloy includes silicon as the primary constituent along with one or more other elements.

Advantageously, the silicon particles described herein can improve performance of electro-chemically active materials such as improving capacity and/or cycling performance. Furthermore, electro-chemically active materials having such silicon particles may not significantly degrade as a result of lithiation of the silicon particles.

The amount of carbon obtained from the precursor can be greater than 0% to about 80% by weight such as about 1% to about 80% by weight, about 1% to about 70% by weight, about 1% to about 60% by weight, about 1% to about 50% by weight, about 1% to about 40% by weight, about 1% to about 30% by weight, about 5% to about 80% by weight, about 5% to about 70% by weight, about 5% to about 60% by weight, about 5% to about 50% by weight, about 5% to about 40% by weight, about 5% to about 30% by weight, about 10% to about 80% by weight, about 10% to about 70% by weight, about 10% to about 60% by weight, about 10% to about 50% by weight, about 10% to about 40% by weight, about 10% to about 30% by weight, about 10% to about 25% by weight, etc. For example, the amount of carbon obtained from the precursor can be about 1%, about 5%, about 10% by weight, about 15% by weight, about 20% by weight, about 25% by weight, etc. from the precursor.

The carbon from the precursor can be hard carbon. Hard carbon can be a carbon that does not convert into graphite even with heating in excess of 2800 degrees Celsius. Precursors that melt or flow during pyrolysis convert into soft carbons and/or graphite with sufficient temperature and/or pressure. Hard carbon may be selected since soft carbon precursors may flow and soft carbons and graphite are mechanically weaker than hard carbons. Other possible hard carbon precursors can include phenolic resins, epoxy resins, and other polymers that have a very high melting point or are crosslinked. The amount of hard carbon in the composite material can be any of the ranges described herein with respect to the amount of carbon obtained from the precursor. For example, in some embodiments, the amount of hard carbon in the composite material can have a value within a range of greater than 0% to about 80%, such as about 1% to about 10%, about 1% to about 20%, about 1% to about 25%, about 1% to about 30%, about 1% to about 40%, about 1% to about 50%, about 5% to about 10%, about 5% to about 20%, about 5% to about 25%, about 5% to about 30%, about 5% to about 40%, about 5% to about 50%, about 10% to about 25% by weight, about 10% to about 30% by weight, about 10% to about 40% by weight, about 10% to about 50% by weight, etc. In some embodiments, the amount of hard carbon in the composite material can be about 1% by weight, about 5% by weight, about 10% by weight, about 20% by weight, about 30% by weight, about 40% by weight, about 50% by weight, or more than about 50% by weight. In certain embodiments, the hard carbon phase is substantially amorphous. In other embodiments, the hard carbon phase is substantially crystalline. In further embodiments, the hard carbon phase includes amorphous and crystalline carbon. The hard carbon phase can be a matrix phase in the composite material. The hard carbon can also be embedded in the pores of the additives including silicon. The hard carbon may react with some of the additives to create some materials at interfaces. For example, there may be a silicon carbide layer between silicon particles and the hard carbon.

In some embodiments, graphite is one of the types of carbon phases from the precursor. In certain embodiments, graphite particles are added to the mixture. Advantageously, graphite can be an electrochemically active material in the battery as well as an elastic deformable material that can respond to volume change of the silicon particles. Graphite is the preferred active anode material for certain classes of lithium-ion batteries currently on the market because it has a low irreversible capacity. Additionally, graphite is softer than hard carbon and can better absorb the volume expansion of silicon additives. In certain embodiments, all, substantially all, or at least some of the graphite particles may have a particle size (e.g., a diameter or a largest dimension) between about 0.5 microns and about 20 microns. In some embodiments, an average particle size (e.g., an average diameter or an average largest dimension) or median particle size (e.g., a median diameter or a median largest dimension) of the graphite particles is between about 0.5 microns and about 20 microns. In some embodiments, the graphite particles may have a distribution of particle sizes. For example, at least about 95%, at least about 90%, at least about 85%, at least about 80%, at least about 70%, or at least about 60% of the particles may have the particle size described herein. In certain embodiments, the composite material can include graphite particles in an amount greater than 0% and less than about 80% by weight, including from 40% to about 75% by weight, from about 5% to about 30% by weight, from 5% to about 25% by weight, from 5% to about 20% by weight, or from 5% to about 15% by weight.

In certain embodiments, conductive particles which may also be electrochemically active are added to the mixture.

Such particles can enable both a more electronically conductive composite as well as a more mechanically deformable composite capable of absorbing the large volumetric change incurred during lithiation and de-lithiation. In certain embodiments, all, substantially all, or at least some of the conductive particles can have a particle size (e.g., the diameter or the largest dimension) between about 10 nanometers and about 7 micrometers. In some embodiments, an average particle size (e.g., an average diameter or an average largest dimension) or a median particle size (e.g., a median diameter or a median largest dimension) of the conductive particles is between about 10 nm and about 7 micrometers. In some embodiments, the conductive particles may have a distribution of particle sizes. For example, at least about 95%, at least about 90%, at least about 85%, at least about 80%, at least about 70%, or at least about 60% of the particles may have the particle size described herein.

In certain embodiments, the mixture includes conductive particles in an amount greater than zero and up to about 80% by weight. In some embodiments, the composite material includes about 45% to about 80% by weight. The conductive particles can be conductive carbon including carbon blacks, carbon fibers, carbon nanofibers, carbon nanotubes, etc. Many carbons that are considered as conductive additives that are not electrochemically active become active once pyrolysed in a polymer matrix. Alternatively, the conductive particles can be metals or alloys including copper, nickel, or stainless steel.

After the precursor is pyrolyzed, the resulting carbon material can be a self-supporting monolithic structure. The carbonized precursor results in an electrochemically active structure that holds the composite material together. For example, the carbonized precursor can be a substantially continuous phase. Advantageously, the carbonized precursor can be a structural material as well as an electro-chemically active and electrically conductive material. In certain embodiments, material particles added to the mixture are homogenously or substantially homogeneously distributed throughout the composite material to form a homogeneous or substantially homogeneous composite.

In some embodiments, the composite material and/or electrode does not include a polymer beyond trace amounts that remain after pyrolysis of the precursor. In further embodiments, the composite material and/or electrode does not include a non-electrically conductive binder. The composite material may also include porosity. In some embodiments, the composite material (or the film) can include porosity of about 1% to about 70% or about 5% to about 50% by volume porosity. For example, the porosity can be about 5% to about 40% by volume porosity.

A current collector may be preferred in some applications, for example, where current above a certain threshold or additional mechanical support may be desired. U.S. patent application Ser. No. 13/333,864, filed Dec. 21, 2011, and published on Jun. 19, 2014 as U.S. Patent Application Publication No. 2014/0170482, entitled "Electrodes, Electrochemical Cells, and Methods of Forming Electrodes and Electrochemical Cells," and U.S. patent application Ser. No. 13/796,922, filed Mar. 12, 2013, and published on Jun. 19, 2014 as U.S. Patent Application Publication No. 2014/0170475, entitled "Electrodes, Electrochemical Cells, and Methods of Forming Electrodes and Electrochemical Cells," each of which is incorporated by reference herein, describe certain embodiments of electrodes including a current collector, electrochemical cells comprising such electrodes, and methods of forming such electrodes and electrochemical cells.

In some embodiments, the full capacity of the composite material of the electrodes described herein may not be utilized during use of the battery to improve life of the battery (e.g., number charge and discharge cycles before the battery fails or the performance of the battery decreases below a usability level). For example, a composite material with about 70% by weight of silicon particles, about 20% by weight of carbon from a precursor, and about 10% by weight of graphite may have a maximum gravimetric capacity of about 3000 mAh/g, while the composite material may only be used up to an gravimetric capacity of about 550 to about 1500 mAh/g. Although, the maximum gravimetric capacity of the composite material may not be utilized, using the composite material at a lower capacity can still achieve a higher capacity than certain lithium ion batteries. In certain embodiments, the composite material is used or only used at an gravimetric capacity below about 70% of the composite material's maximum gravimetric capacity. For example, the composite material is not used at an gravimetric capacity above about 70% of the composite material's maximum gravimetric capacity. In further embodiments, the composite material is used or only used at an gravimetric capacity below about 50% of the composite material's maximum gravimetric capacity or below about 30% of the composite material's maximum gravimetric capacity.

EXAMPLES

The following examples are provided to demonstrate the benefits of some embodiments of electrodes, electrochemical cells, and methods of forming the same. These examples are discussed for illustrative purposes and should not be construed to limit the scope of the disclosed embodiments.

Figure 4:
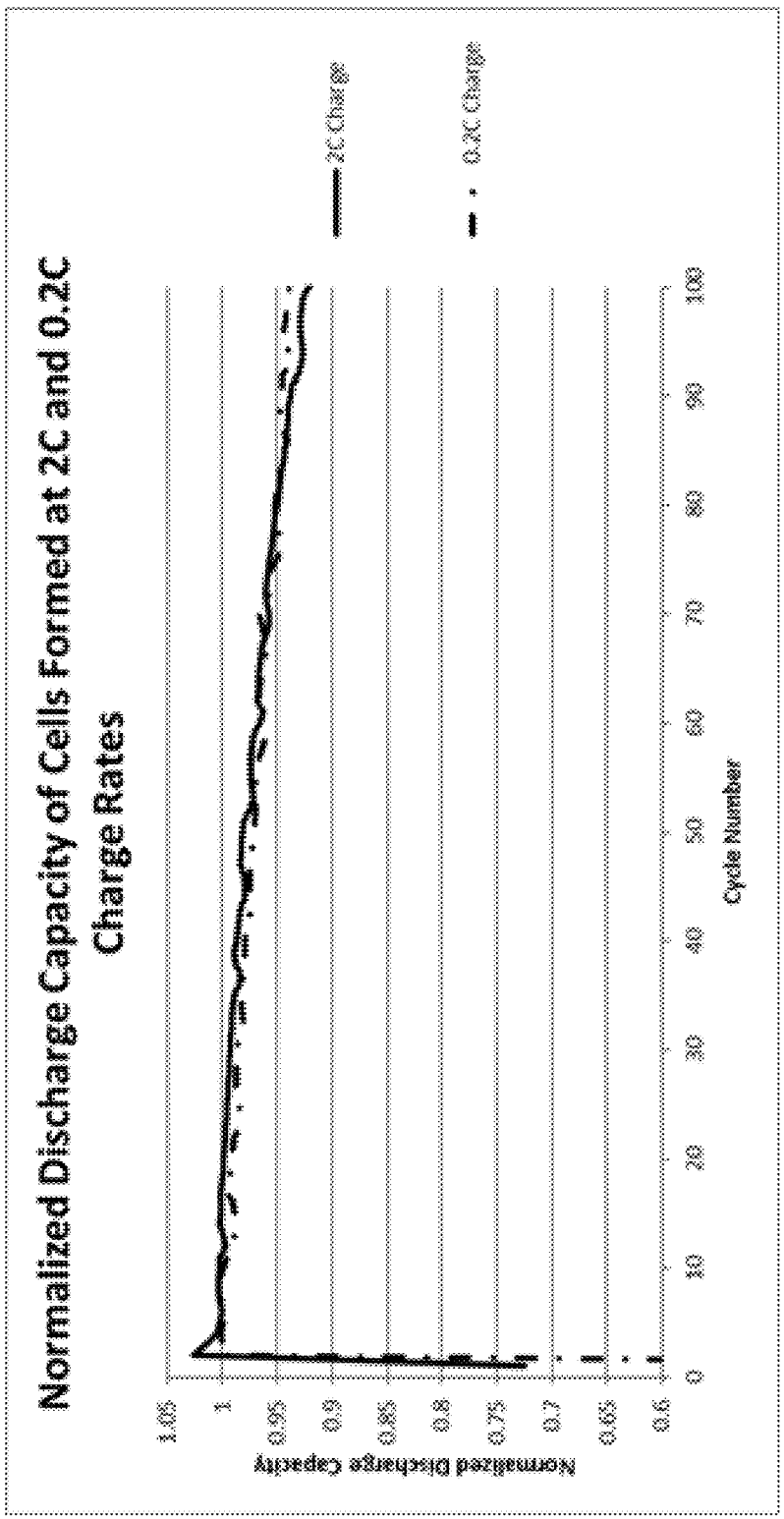
FIG. 4 shows the normalized discharge capacity of cells formed at 2 C and 0.2 C charge rates.

FIG. 4 shows the normalized discharge capacity retention of cells formed at 2 C and 0.2 C charge rates. The cells contained 90% lithium nickel cobalt aluminum oxide (NCA) cathodes and 70% silicon-dominant composite anodes in accordance with certain embodiments described herein. The first formation charge was at 2 C charge rate or 0.2 C charge rate. The first charge was to 4.2V with a taper charge to C/20, followed by 5 hours rest, and 0.2 C discharge to 3.1V. The cells' performances were evaluated by cycling them between 4.2 to 3.1V at 1 C charge (with taper to C/20) and 1 C discharge rates. As shown in FIG. 4, the data shows no significant difference between charging at 2 C vs 0.2 C for the constant current portion in a constant current/constant voltage regime.

In another example, cells were constructed using silicon-dominant composite anodes with 80% silicon content by weight, with average loading of 3.8 mg/cm$^2$ and average thickness of 30 µm, attached to 15 µm copper foil with polyamideimide adhesive. The cathodes were 97% lithium cobalt oxide, 1% conductive additive, and 2% PVdF, coated on 15 µm aluminum foil at an average loading of 28 mg/cm$^2$ and an average density of 4.0 g/cc. The electrolyte was a solution of 1.2M LiPF$_6$ in organic carbonates. The cell design included 19 layers, with overall dimensions of 38.5 mm×64.0 mm×6.0 mm and a nominal capacity of 3.1 Ah. The cells were formed using 3 different formation protocols (2 cells each):

A. 1 C charge to 4.3V, Constant Voltage at 4.3V to C/20.
B. Constant Voltage at 4.3V to C/20.
C. Constant Voltage at 4.3V for 10 minutes.

Figure 5:
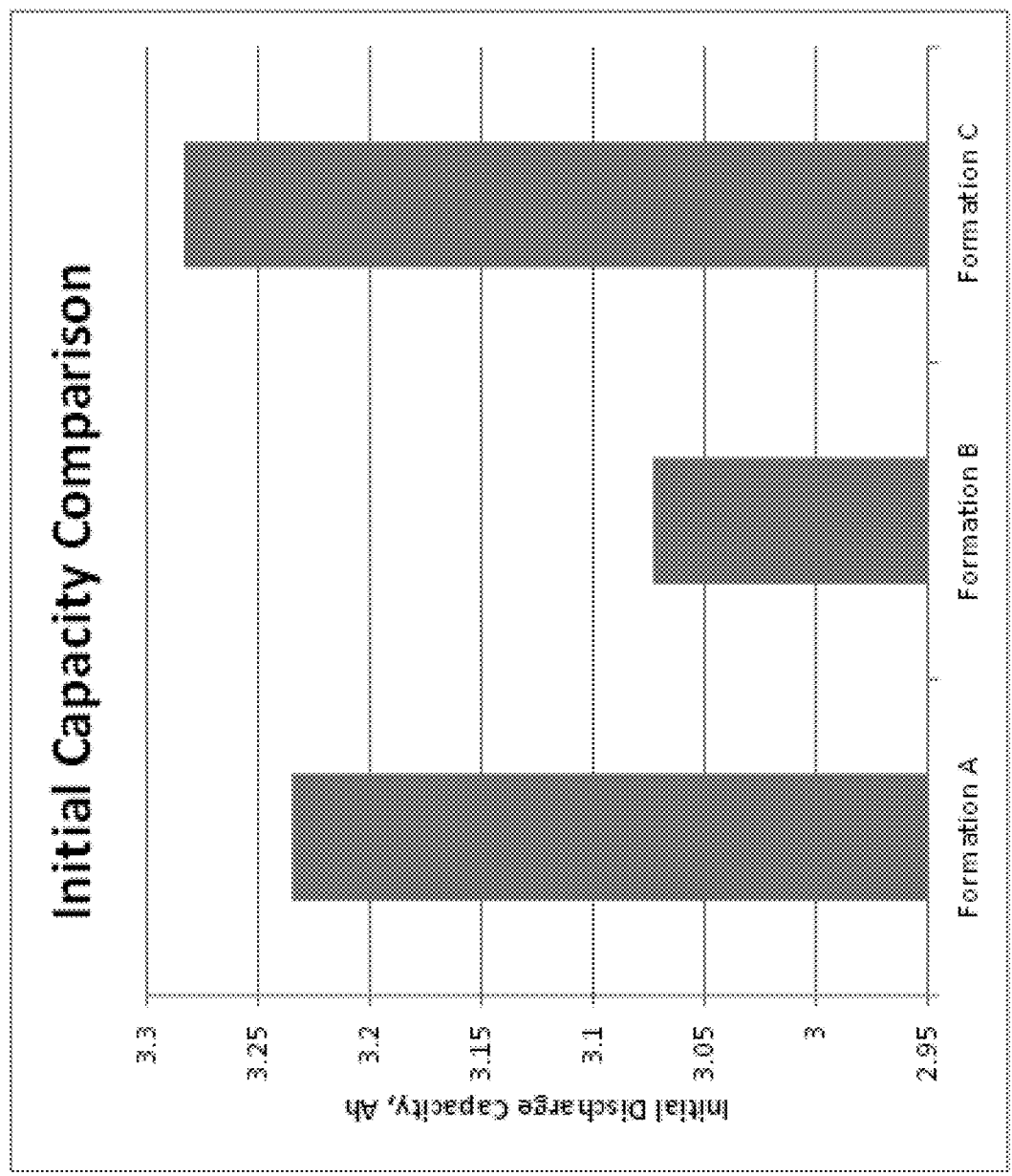
FIG. 5 shows the initial C/5 discharge capacity to 2.75V of 3.1 Ah cells with three different formation protocols.
Figure 6:
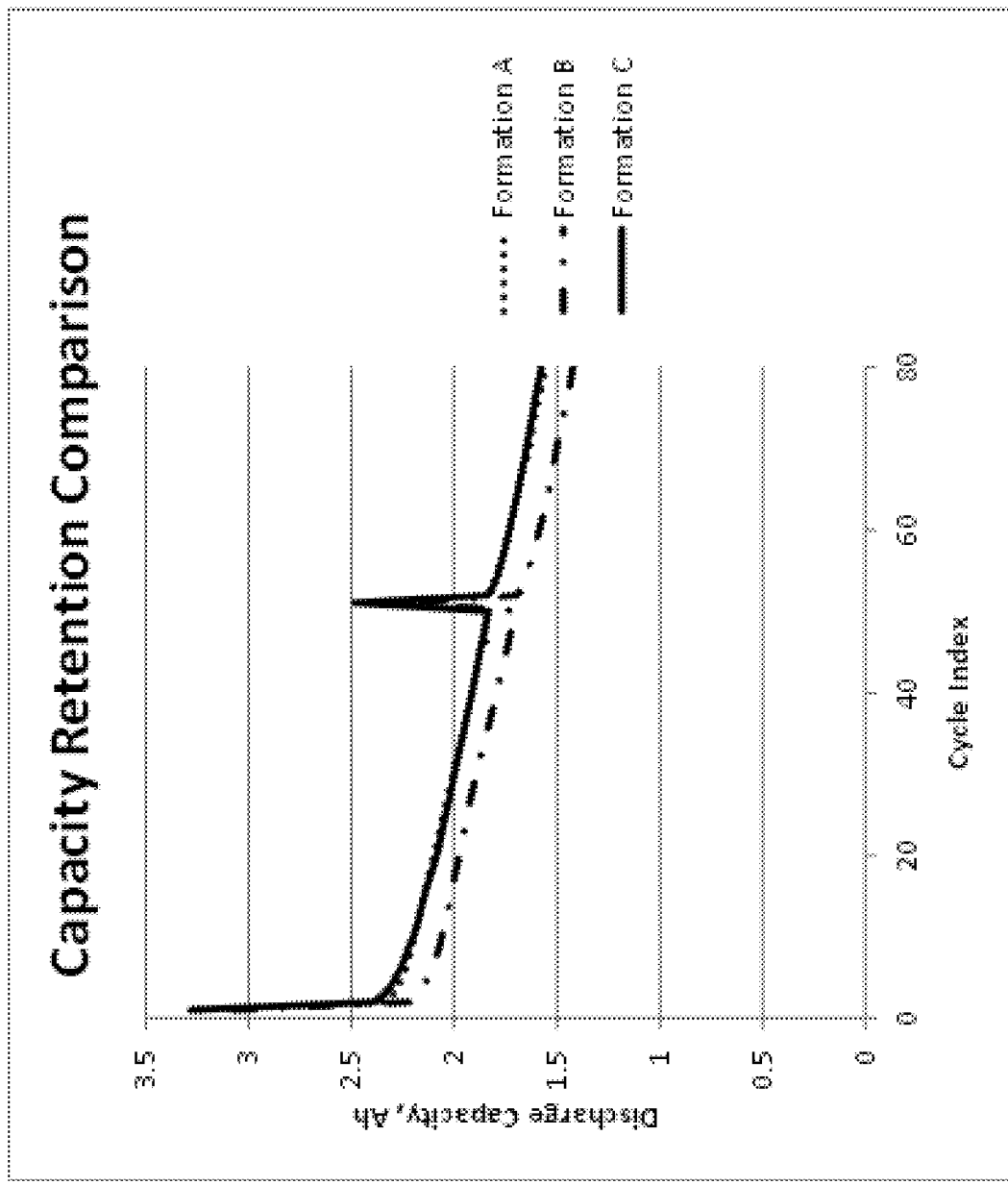
FIG. 6 shows the discharge capacity retention of 3.1 Ah cells formed by three different formation protocols.

FIG. 5 shows the initial C/5 discharge capacity to 2.75V of the 3.1 Ah cells with the three different formation protocols. FIG. 6 shows the discharge capacity retention of the cells. The cells' performance characteristics were evaluated using a protocol in which they were charged at 2 C to 4.3V, held at constant voltage to C/20, and discharged at 0.5 C to 3.3V (discharged to 2.75V every 50 cycles). The cells had very similar capacity retention on a normalized basis, but the cells with formation B had lower initial discharge capacity. Reducing the constant voltage formation from a full charge (formation B) to a partial charge (formation C) resulted in an increase in capacity to match that of the 1 C formation (formation A), with the added benefit of reducing the charge time from 210 minutes (compared to Formation A) and from 99 minutes to 10 minutes (compared to Formation B).

For example, the Formation C cells completed formation charge in 10 minutes, and the whole formation sequence (consisting of a rest step, a charge step, and a discharge step) was completed in 23 minutes. This was achieved by placing a 3.1 Ah cell on a 1-minute rest to check the stability of the electrical connection, followed by a 4.3V constant voltage taper charge for 10 minutes. The cell took 6 A immediately, which was the maximum current available from the channel, reaching ~30% SOC in 10 minutes. The cell was then discharged at 0.7 C to 3.3V, a 12-minute discharge step. The cell was cycled between 4.3V and 3.3V at 2 C charge rate and 0.5 C discharge rate. Compared to a cell that went through a constant current, constant voltage formation protocol (Formation A), the cell (Formation C) demonstrated similar performance. In the specific case, the formation charge step was completed in ~5% of the time for Formation A (10 minutes vs. 210 minutes) and in ~10% of the time for Formation B (10 minutes vs. 99 minutes).

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A method of forming an electrochemical cell, the method comprising:
   providing an electrochemical cell comprising:
      a first electrode and a second electrode, wherein at least the first electrode comprises at least about 20% to about 99% by weight of silicon;
      a separator between the first electrode and the second electrode; and
      an electrolyte in contact with the first electrode, the second electrode, and the separator; and
   providing a formation process comprising a charge step, a rest step, and a discharge step, the charge step comprising providing a formation charge current at greater than about 1 C to the electrochemical cell, wherein the formation process is completed in approximately 10 minutes to 120 minutes.

2. The method of claim 1, wherein the formation charge current is provided at less than or equal to about 20 C.

3. The method of claim 1, wherein the formation charge current is provided at greater than about 2 C.

4. The method of claim 3, wherein the formation charge current is provided at less than or equal to about 20 C.

5. The method of claim 1, wherein the formation charge current is provided for about 3 minutes to about 60 minutes.

6. The method of claim 1, wherein providing the formation charge current comprises charging to partial formation.

7. The method of claim 6, wherein charging to partial formation comprises charging to about 10% to about 90% of total capacity of the electrochemical cell.

8. The method of claim 7, wherein charging to partial formation comprises charging to about 20% to about 70% of the total capacity of the electrochemical cell.

9. The method of claim 8, wherein charging to partial formation comprises charging to about 30% to about 50% of the total capacity of the electrochemical cell.

10. The method of claim 1, wherein providing the formation charge current comprises providing a substantially constant formation charge current.

11. The method of claim 1, wherein providing the formation charge current comprises providing the formation charge current at a charge voltage from about 3 volts to about 6 volts.

12. The method of claim 1, wherein the electrochemical cell is a lithium-ion battery and providing the formation charge current comprises providing the formation charge current with substantially no lithium plating.

13. The method of claim 1, wherein the first electrode is an anode.

14. The method of claim 1, wherein the first electrode comprises a silicon-dominant electrode.

15. The method of claim 1, wherein the first electrode comprises the silicon at about 30% to about 99% by weight.

16. The method of claim 15, wherein the first electrode comprises the silicon at about 40% to about 99% by weight.

17. The method of claim 16, wherein the first electrode comprises the silicon at about 50% to about 99% by weight.

18. The method of claim 17, wherein the first electrode comprises the silicon at about 60% to about 99% by weight.

19. The method of claim 18, wherein the first electrode comprises the silicon at about 70% to about 99% by weight.

20. The method of claim 19, wherein the first electrode comprises the silicon at about 80% to about 99% by weight.

21. The method of claim 1, wherein the first electrode further comprises graphite.

* * * * *